US008888588B2

(12) United States Patent
Vallejo et al.

(10) Patent No.: US 8,888,588 B2
(45) **Date of Patent: *Nov. 18, 2014**

(54) GAME RATING SYSTEM FOR GAMING DEVICES

(71) Applicant: Bally Gaming, Inc., Las Vegas, NV (US)

(72) Inventors: John R. Vallejo, Henderson, NV (US); Michael J. Mitchell, Las Vegas, NV (US); Brian K. Lanning, Las Vegas, NV (US); Marvin A. Hein, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,198

(22) Filed: Jan. 14, 2014

(65) Prior Publication Data

US 2014/0148241 A1 May 29, 2014

Related U.S. Application Data

(63) Continuation of application No. 11/559,405, filed on Nov. 13, 2006, now Pat. No. 8,708,812.

(51) Int. Cl.
*A63F 13/00* (2014.01)
*G07F 17/32* (2006.01)
*G07F 17/34* (2006.01)

(52) U.S. Cl.
CPC .............. *G07F 17/323* (2013.01); *G07F 17/34* (2013.01); *G07F 17/32* (2013.01); *G07F 17/3262* (2013.01)
USPC ............................................... 463/29; 463/23

(58) Field of Classification Search
CPC ... G07F 17/32; G07F 17/323; G07F 17/3204; A63F 2300/57
USPC .......................................... 463/23, 25, 29, 42
See application file for complete search history.

(56) References Cited

U.S. PATENT DOCUMENTS

| | | | | |
|---|---|---|---|---|
| 5,813,914 | A | 9/1998 | McKay et al. | |
| 6,645,077 | B2 | 11/2003 | Rowe | |
| 7,035,626 | B1 * | 4/2006 | Luciano, Jr. | 455/414.1 |
| 2003/0182574 | A1 | 9/2003 | Whitten et al. | |
| 2004/0048667 | A1 * | 3/2004 | Rowe | 463/40 |
| 2004/0219962 | A1 | 11/2004 | Vancura | |
| 2005/0096121 | A1 * | 5/2005 | Gilliland et al. | 463/20 |
| 2005/0130737 | A1 | 6/2005 | Englman et al. | |
| 2007/0060252 | A1 * | 3/2007 | Taylor | 463/16 |

OTHER PUBLICATIONS

"WMS Improvements Based on Perceived Interest of Players," Gaming Industry Observer; Oct. 16, 2006; pp. 6 and 8.

* cited by examiner

*Primary Examiner* — Damon Pierce
*Assistant Examiner* — Allen Chan
(74) *Attorney, Agent, or Firm* — Brooke Quist; Marvin Hein

(57) ABSTRACT

Gaming machines and gaming systems having a game rating system are disclosed herein. According to one embodiment, the gaming device includes a plurality of games where each game has a distinct game style that is based in part on game volatility. The gaming device also includes a game controller for managing and operating the plurality of games, and a game rating system in communication with the game controller. The game rating system includes a player interface for selecting a game, and an icon presented on the display of the gaming device where the icon represents the distinct game style.

20 Claims, 8 Drawing Sheets

GAME RATING SYSTEM FOR GAMING DEVICES

CROSS-REFERENCE TO RELATED APPLICATIONS

This application is a continuation of U.S. patent application Ser. No. 11/559,405, filed Nov. 13, 2006, entitled GAME RATING SYSTEM FOR GAMING DEVICES AND RELATED METHODS, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Various types of gaming machines have been developed in order to increase and/or maintain player participation and patronage. Traditionally, slot machines garner player interest by providing the player with the opportunity to win cash awards based upon a player's wager. Accordingly, various types of games or game features have been developed to provide players with the opportunity to win large sums of money for a small wager. For example, games may include one or more bonus games or the opportunity to win progressive jackpots in order to maintain player interest. Additionally, the games have grown in sophistication and features in order to maintain player interest. For example, slot machine games have been developed to include multipliers, wild symbols, or other special symbols in order to add excitement to the game.

Nevertheless, the wide variety of games choices available to casino patrons may be so overwhelming that dissuade players' from playing a game. That is, a casino patron may not want to play a game because it is difficult to determine winning outcomes or how to play the game. Furthermore, a particular game may not be enjoyable to a player because the game does not fit a player's desired win profile. More specifically, a player may want to play a game having infrequent but large payout. Alternatively, a player may want to play a game having more frequent but smaller payouts thereby allowing the player to play a gaming machine for longer periods of time. In another scenario, a casino patron may not want to play a particular game because the game appears to be unfamiliar even though the game is merely the familiar underlying game having a different game theme. Accordingly, there is a need for gaming machine variants that provide a player with an enhanced gaming experience tailored to a particular game profile.

SUMMARY

Briefly, and in general terms, various embodiments are directed to gaming machines, gaming systems having a game rating system. According to one embodiment, the gaming device includes a plurality of games of chance for play. Continuing, the gaming device includes: a plurality of reels having indicia provided therein, a game controller in communication with the plurality of reels, and a game rating system in communication with the game controller. The game controller generates a game outcome and controls the spinning of the reels. The game rating system alters a game style and volatility index affecting payout frequency of a game of chance in response to player input. Additionally, the game rating system includes a game rating icon that corresponds to and represents game rating information for an associated game on the gaming device, wherein the game rating icon is displayed to players to enable players to quickly and easily determine if the game associated with the game rating icon is compatible with the player's interest.

In addition to gaming machines having a game rating system, game management systems are disclosed herein. According to one embodiment, the game management system includes a plurality of networked gaming machines presenting one or more games where a game rating icon is associated with each game. The game management system also includes a server system in communication with the plurality of networked gaming machines, wherein at least part of the communication uses a TCP/IP connection. The server system receives information from the networked gaming machines, and wherein the server system manages the plurality of networked games based on the game rating icons associated with each game. Additionally, game management system includes a game rating system alters a game style and volatility index affecting payout frequency of a game of chance in response to player input. The game rating system includes a game rating icon that corresponds to and represents game rating information for an associated game on the gaming device, wherein the game rating icon is displayed to players to enable players to quickly and easily determine if the game associated with the game rating icon is compatible with the player's interest.

In another embodiment, the gaming system includes a plurality of networked gaming machines where each gaming machine presents a selection of games for game play. A game rating system is in communication with the gaming machines, a game rating system, and a server system. The game rating system in communication with the game controller, wherein the game rating system alters a game style and volatility index affecting payout frequency of the game of chance in response to player input, wherein the game rating system includes a dynamic game rating icon that corresponds to and represents game rating information for an associated game on the gaming device. The game rating icon is displayed to players to enable players to quickly and easily determine if the game associated with the game rating icon is compatible with the player's interests. The server system in communication with each of the plurality of networked gaming machines, wherein at least part of the communication uses a TCP/IP connection. The server system transmits one or more games, game-related information, or non-game related information to the networked gaming machines.

Other features and advantages will become apparent from the following detailed description, taken in conjunction with the accompanying drawings, which illustrate by way of example, the features of the various embodiments.

DETAILED DESCRIPTION

Various embodiments are directed to gaming machines having a game rating system. The game rating system provides an indicia that identifies the game style and/or the game features. Accordingly, players are able to quickly and easily determine if the game is compatible with their gambling habits. That is, for example, the game rating indicia may represent that the game has frequent but small payouts (i.e., dribbler game) or that the game has large but infrequent payouts (i.e., high volatility game). In one embodiment, a gaming machine having the game rating system includes a rating icon on the display glass (e.g., top or bottom glass). Alternatively, the rating icon is presented on the main and/or secondary video display. In some embodiments, a legend (i.e., key to the definitions of game rating icons) may also be provided on display glass or video displays of the gaming machine. The game rating system allows a player to find a game that is tailored to their gambling habits. For example, a player having a large bankroll may prefer to play the high volatility game with the larger payouts rather than the dribbler game. In contrast, a player who wants to be entertained for longer periods of time would prefer to play the dribbler game in order to maximize their time on a gaming machine.

In one embodiment, the gaming machine having a game rating system only presents a single game. Alternatively, the gaming machine presents a plurality of games having different game ratings. All the games on the gaming machine have a similar theme but the games are different game styles. The multi-game gaming machine may be a video-based gaming machine or a mechanical reel slot machine. In one embodiment of a multi-game mechanical-based slot machine, one or more of the reels may include a generic symbol on the reel strip. The generic symbols have a unique, predetermined property associated such as, but not limited to, a bonus game trigger, wild symbol, free spin, multiplier, jackpot symbol, or the like. The generic symbols increases the number of game outcome combinations thereby allowing a mechanical-reel gaming machine to present a plurality of games.

Figure 1:
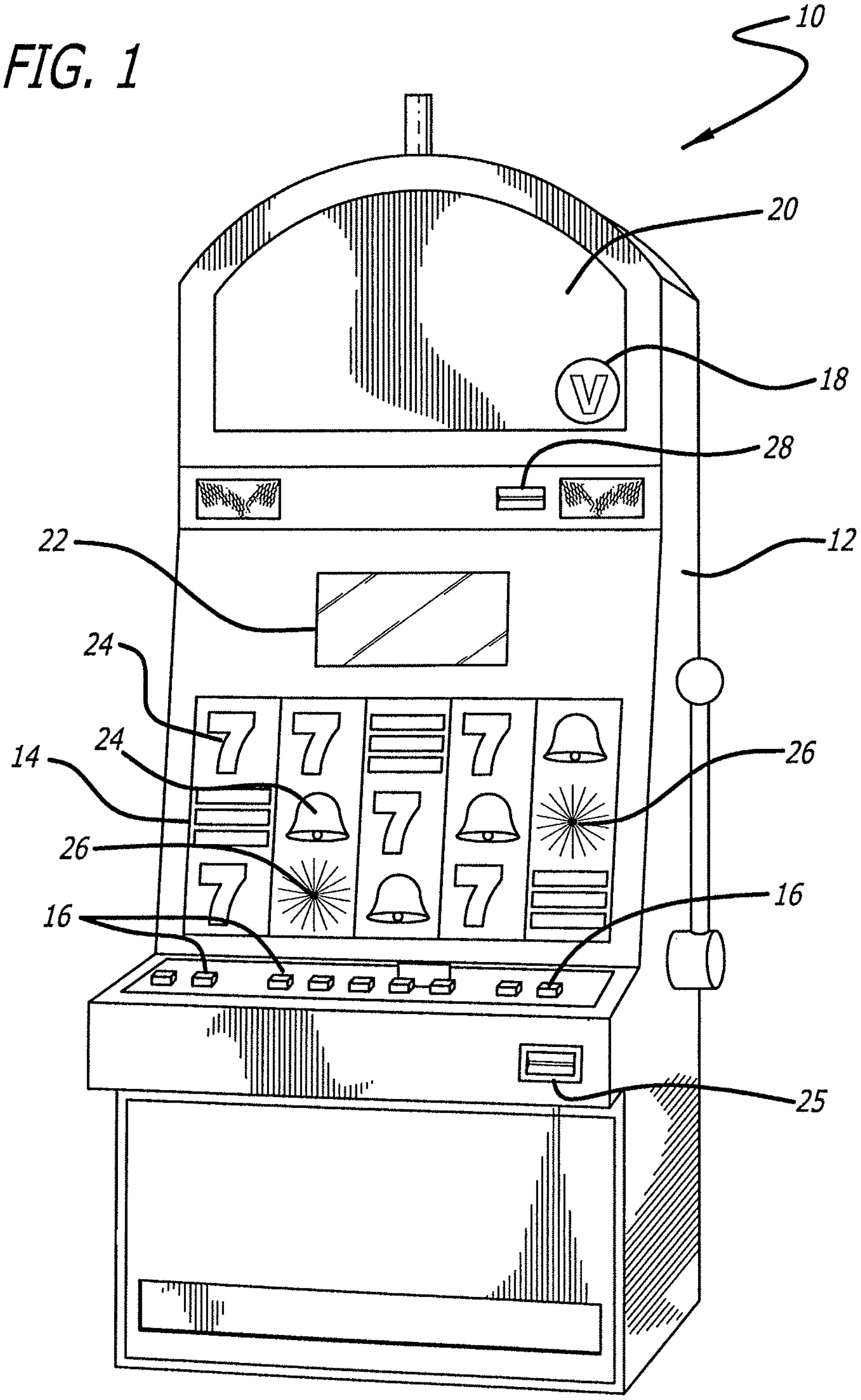
FIG. 1 is a perspective view of one embodiment of a gaming machine having a game rating system.

Referring now to the drawings, wherein like reference numerals denote like or corresponding parts throughout the drawings and, more particularly to FIGS. 1-5, there are shown various embodiments of a gaming machine having a game rating system. More specifically, as shown in FIG. 1, the gaming machine 10 includes a cabinet 12 that accommodates a game display 14, a plurality of player-activated buttons 16, and a game rating icon 18 presented on the top glass 20. The cabinet 12 is a self-standing unit that is generally rectangular in shape. In other embodiments, the cabinet (not shown) may be, without limitation, a table-top style cabinet, or a slant-top cabinet.

The game rating icon 18 depicted in FIG. 1 is a representation of the game style and other features of the presented game. The game style relates to the game payout volatility. Generally, all wagering games are volatile, but the range of volatility may be varied from game to game. For example, a game may be highly volatile in the sense that there are fewer winning outcomes, but those winning outcomes generally have a larger payout. As shown in FIG. 1, these highly volatile games are represented by the letter "V." Alternatively, a game may be less volatile in the sense that there are relatively frequent winning outcomes, but these winning outcomes generally have a smaller payout. These types of low volatility games may be represented by the letter "E" to signify that the game is highly entertaining, easy to understand with longer durations of game play. As those skilled in the art will appreciate, other symbols, words, graphics, may be used to convey game volatility to the player.

Additionally, the game rating icon 18 may include one or more symbols to signify additional features of the game. The game features may be related to complexity of the game (e.g., large number of winning combinations, large number of paylines, or unique paylines). For example, the letter "C" may represent that the game has complex play components that may require the player to read the help screen for additional details. Additionally, the game ratings icon 18 may include one or more symbols directed to game features. For example, the letter "B" represents that the game has a bonus game. In another embodiment, the type of bonus game may also be represented in the game rating icon. For example, the letters "BW" represents that the gaming machine includes bonus wheel game. In other embodiments, different game rating icons may represent that the bonus game includes multiple cards, a board game, trivia, or games involving player skill. Furthermore, the game rating icon 18 may also include a letter, words, or symbols to represent that the game is a progressive jackpot game (e.g., the letter "P"), a tournament game (e.g., the letter "T"), or a group game (e.g., the letter "G"). As a result, the player is able to select an appropriate game for their gambling style based upon the information provided by the game ratings icon.

In another embodiment, the game rating icon 18 provides information about the number of paylines available for wagering. A number may be included with the icon to represent the number of paylines that may be wagered on the game. For example, a progressive jackpot game having up to 5 paylines may be represented by the game rating icon, "P5." Alternatively, the game rating icon (not shown) may include a range of paylines available for a game.

Figure 2:
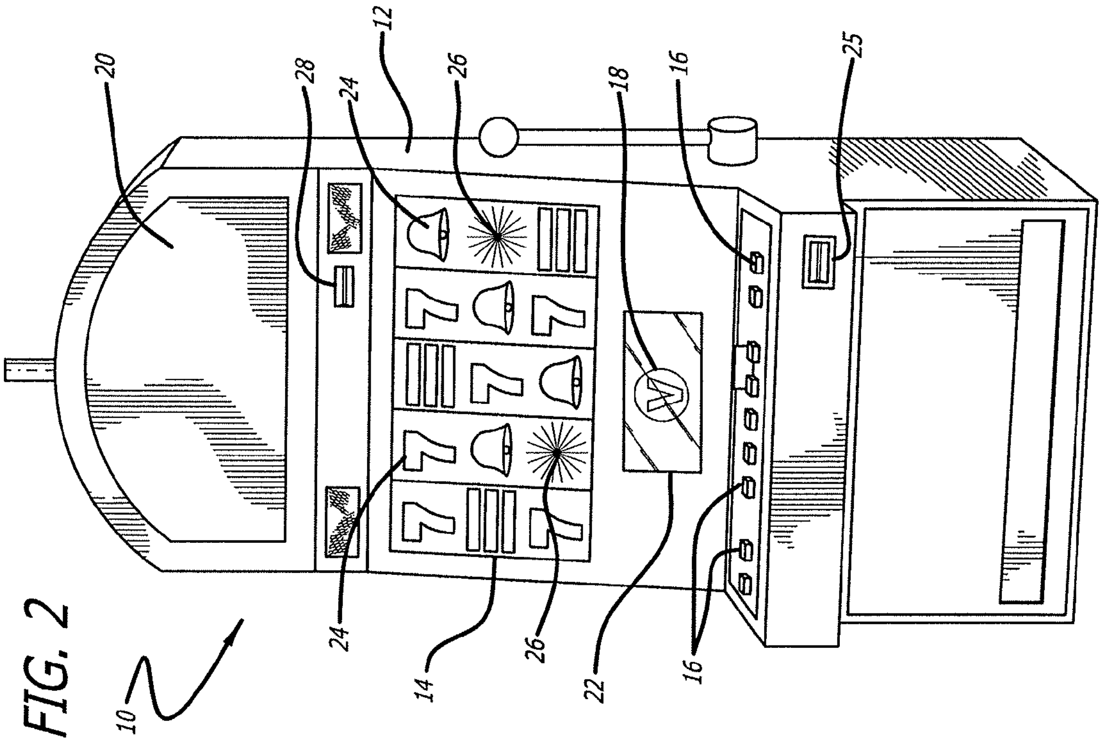
FIG. 2 is a perspective view of another embodiment of a gaming machine having a game rating system.

As shown in FIG. 1, the game rating icon 18 is presented on the top glass 20 of the gaming machine. Alternatively, the game rating icon (not shown) may be placed on the bottom display glass or on the area adjacent to the main display 14. Turning now to FIG. 2, the game rating icon 18 is presented on a secondary video display 22. The secondary display 22 may be a video display or a backlit display glass. In the embodiment where the secondary display 22 is a video display, a touch screen system (not shown) may be incorporated into the display. As a result, the player may touch the game rating icon 18 or access a help menu (not shown) for a description of the icon. As those skilled in the art will appreciate, the game rating icon 18 may be positioned anywhere on the gaming machine 10 that is visible to the player.

Figure 3:
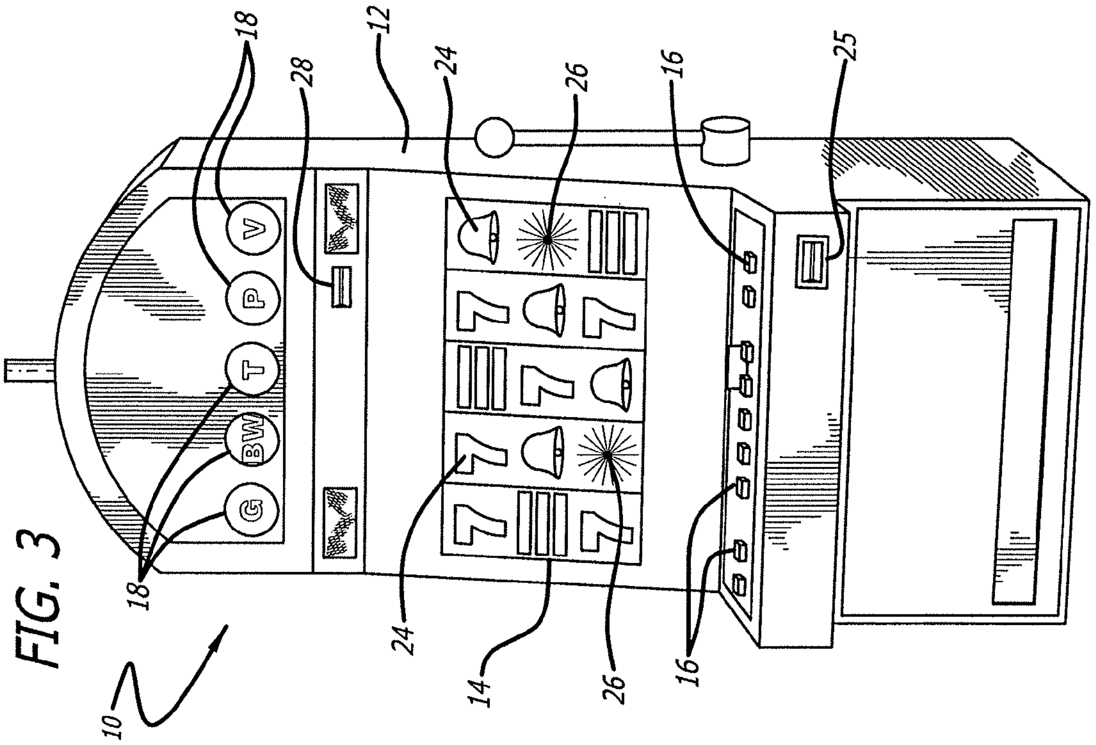
FIG. 3 is a perspective view of yet another embodiment of a gaming machine having a game rating system.

FIG. 3 illustrates an embodiment of a gaming machine 10 that presents a plurality of games. The gaming machine 10 includes a plurality of game rating icons 18 that correspond to the games on the gaming machine. The game rating icons 18 are shown on the top glass 20, and the icon 18 corresponding to the selected game is backlit or otherwise illuminated. Alternatively, all the game rating icons 18 may be presented on a secondary video display 22. In another embodiment, the icon 18 corresponding to the selected game is presented on the main display for a video-based game display. In another embodiment of a multi-game machine, the game rating icon 18 corresponding to the selected game is presented on a dedicated display for the game rating icon.

Referring to FIG. 1, the game display 14 presents a plurality of mechanical reels. The game display 14 depicted in FIG. 1 includes five mechanical reels, but other embodiments of the game display (not shown) may present reel games having three reels, four reels, or any number of reels. In another embodiment, the reels may be video depictions. In yet another embodiment, the game display (not shown) presents a combination of mechanical reels and video depictions of reels.

As shown in FIG. 1, the reels also include a plurality of symbols 24 fixed on the outer periphery of the reels. A winning combination results when all the reels stop and form a predetermined combination symbols. Additionally, each of the reels may include one or more generic symbols 26. According to one embodiment, the generic symbols 26 have different "meanings" for different games. Stated differently, while the generic symbol 26 may have the same physical appearance for each game, the generic symbol has a different function depending on the game selected. For example, the generic symbol 26 may represent a bonus game trigger, a progressive jackpot symbol, a multiplier, free spin, or a wild symbol depending on the game being played.

In an embodiment of a gaming machine having mechanical reels, the appearance of the generic symbols (not shown) may be changed by altering the lighting associated with the reels. For example, according to one embodiment, backlighting may be applied to the generic symbol to show the player that the symbol is active. Alternatively, the appearance of the symbol may be changed by backlighting the generic symbol with different colors. In another embodiment, the appearance of the generic symbol (not shown) may be altered by applying external lighting (e.g., black light) to the reels.

According to various embodiments, the game display 14 presents one or more games of chance such as, but not limited to, mechanical slots, video slots, video keno, video poker, video blackjack, video roulette, or Class II bingo. In alternate embodiments, the game display 14 may present games of skill or games of chance involving some player skill. In one embodiment, the game display 14 is a flat video panel display including by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including by way of example only, and not by way of limitation, EDTV, HDTV, or DLP (Digital Light Processing). According to one embodiment, the video display is a widescreen display (i.e., 16:9 aspect ratio display) that may be mounted in the gaming cabinet 12 in a portrait or landscape orientation. In another embodiment, the video display may also include a touch screen or touch glass system (not shown). The touch screen system allows a player to input choices without using any electromechanical buttons 16. Alternatively, the touch screen system may be a supplement to the electromechanical buttons 16.

As shown in FIGS. 1 and 2, a secondary video display 22 may be provided in the gaming cabinet 12. The additional display 22 may be used to display a pay table, animation, top box artwork, progressive jackpot information, advertising, help menus, or any game-related or general interest information. In another embodiment, the additional display 22 may also present a secondary game such as, but not limited to, video slot game, video keno, video poker, video roulette, or Class II bingo.

Referring now only to FIG. 1, the gaming machine 10 includes a plurality of player-activated buttons 16. These buttons 16 may be used for various functions such as, but not limited to, selecting a wager denomination, selecting a number of games to be played, selecting the wager amount per game, selecting a game to play, initiating a game, or cashing out money from the gaming machine 10. Additionally, one or more buttons 16 may be used to select a game for play on a multi-game machine. While the buttons 16 shown in FIG. 1 are mechanical buttons, a touch screen system, touch pad, track ball, mouse, switches, toggle switches, or other input means may be used to accept player input.

In an alternate embodiment, a cellular phone or other input device (e.g., PDA), separate and apart, from the gaming machine may also be used to input various player choices and information to enhance the player's interactive experience with the gaming machine. Furthermore, inputting information via these devices provides an added level of security as any key presses may be hidden from view. In yet another embodiment, a player may call or send a text message or a short message service (SMS) to the gaming machine.

As shown in FIGS. 1-3, the gaming machine 10 includes a cashless gaming system (not shown). The cashless gaming system includes a ticket printer and ticket reader that are provided on the gaming machine 10. The ticket printer and ticket reader may be separate or integral components. As shown in FIGS. 1-3, the same slot 25 may be used to insert and/or issue a ticket from the cashless gaming system Alternatively, the ticket reader and the ticket printer have separate slots (not shown) for receiving and issuing tickets, respectively. In one embodiment, the ticket reader (not shown) of the cashless gaming system is capable of accepting previously printed vouchers, paper currency, promotional coupons, or the like. The ticket printer (not shown) of the cashless gaming system generates vouchers having printed information that includes, but is not limited to, the value of the voucher (i.e., cash-out amount) and a barcode that identifies the voucher.

Additionally, in another embodiment, the gaming machine 10 is in communication with a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a slot for receiving a player tracking card, a keypad or equivalent, an electronic button receptor, a touch screen and the like. For example, a slot 28 for receiving a player tracking card is shown in FIGS. 1-3. The player tracking system 28 may also include a database of all qualified players (i.e., those players who have enrolled in a player rating or point accruing program). Generally, the database for the player tracking system 28 is separate from the gaming machines 10.

Figure 4:
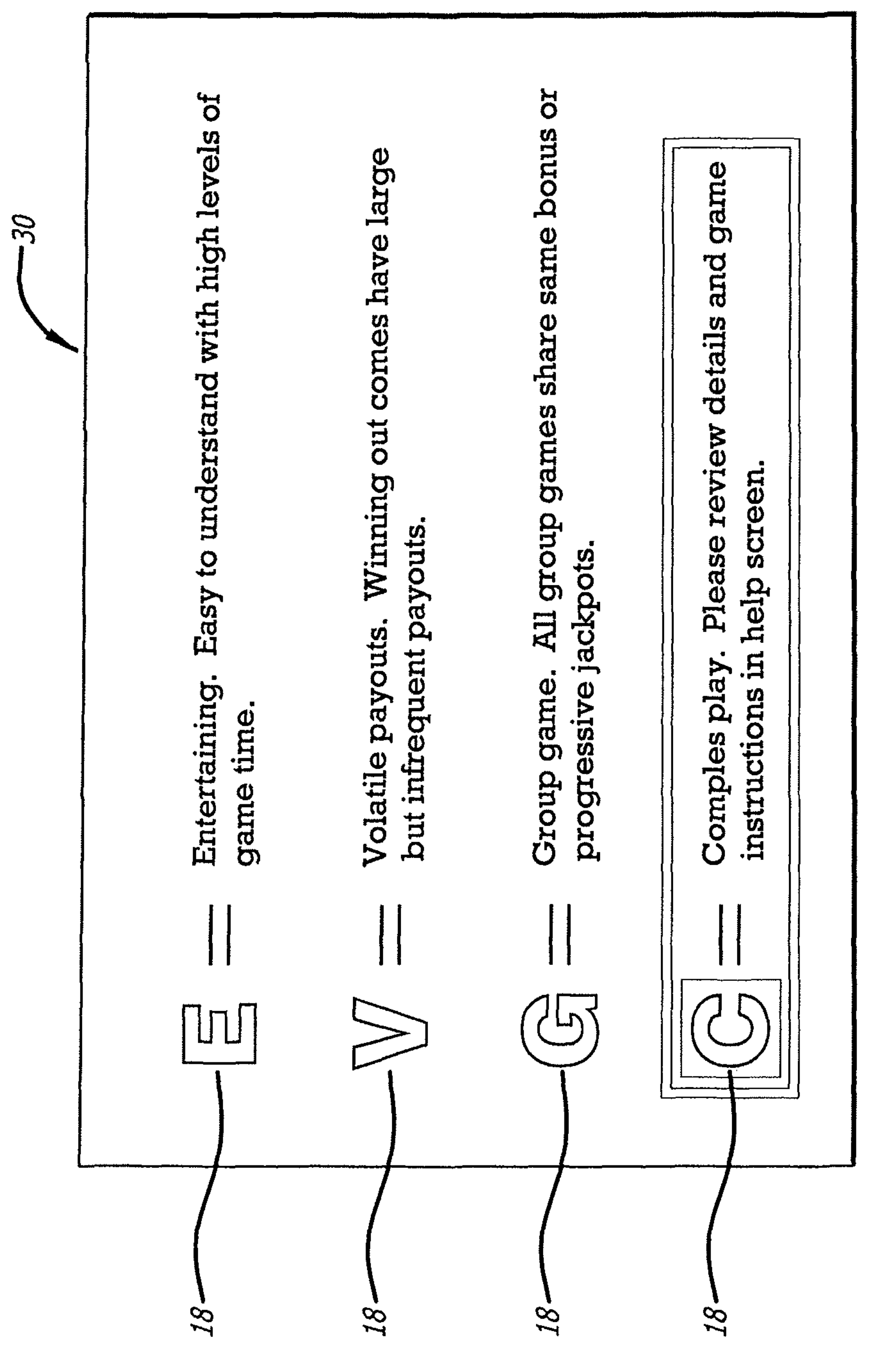
FIG. 4 is a depiction of one embodiment of a screenshot of a game rating system.

Turning now to FIG. 4, one embodiment of a video screenshot 30 of a game rating system for a gaming machine 10 presenting a plurality of games. The screenshot 30 presents the game rating icons 18 and a description of each of the icons. As shown in FIG. 4, the game rating icon 18 corresponds to the game being presented on the main display (not shown). The game rating icon 18 corresponding to the game presented on the main display may be highlighted (or otherwise distinguished) with animation, graphics, sound effects, or an audio track describing the game rating icon.

In an alternate embodiment, the video screenshot 30 may be replaced with a display glass (not shown) having the game rating icons 18 (and descriptions) may be printed thereon. In one embodiment, the display glass may be backlit to highlight the game rating icons. In another embodiment, the portion of the display glass corresponding to a particular game rating icon is backlit when the corresponding game is selected.

Figure 5A:
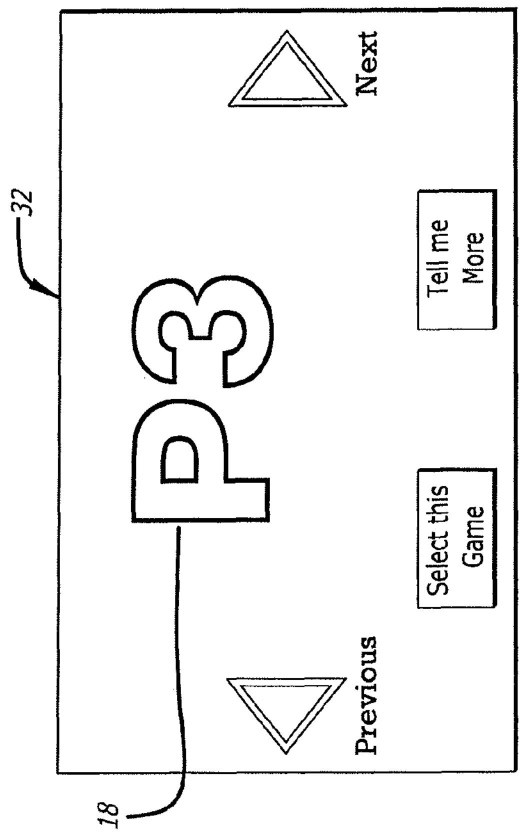
FIGS. 5A-5B depict another embodiment of a screenshot of a game rating system.
Figure 5B:
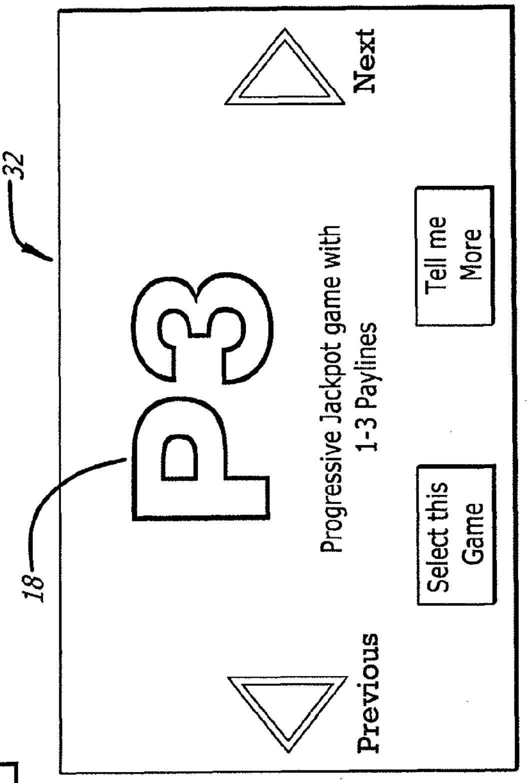

FIGS. 5A-5B illustrate another screenshot 32 of a display of a game rating system. As shown in FIG. 5A, the game rating icon 18 (e.g., "P3") is shown on the video display 22. Similar to the screenshot of FIG. 4, the game rating icon 18 corresponds to the game being presented on the main display (not shown). As shown in FIG. 5A, the video display screen includes a touch screen button that allows the player to select the game that has a P3 game rating. Alternatively, the player is able to touch the portion of the screen to obtain more information (i.e., "Tell me more" button") regarding the P3 game rating as shown in FIG. 5B. Accordingly, the player is able to select a game that is appropriate to their gambling style.

Figure 6A:
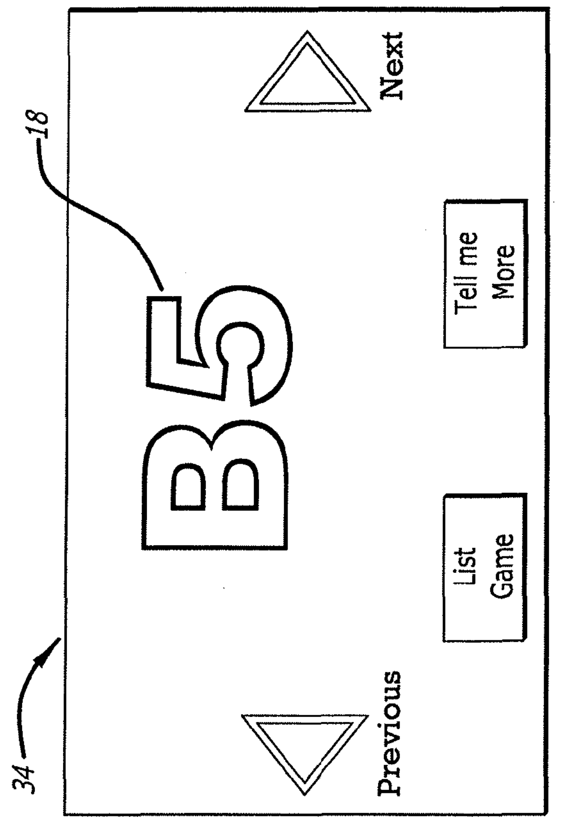
FIGS. 6A-6B depict yet another embodiment of a screenshot of a game rating system.
Figure 6B:
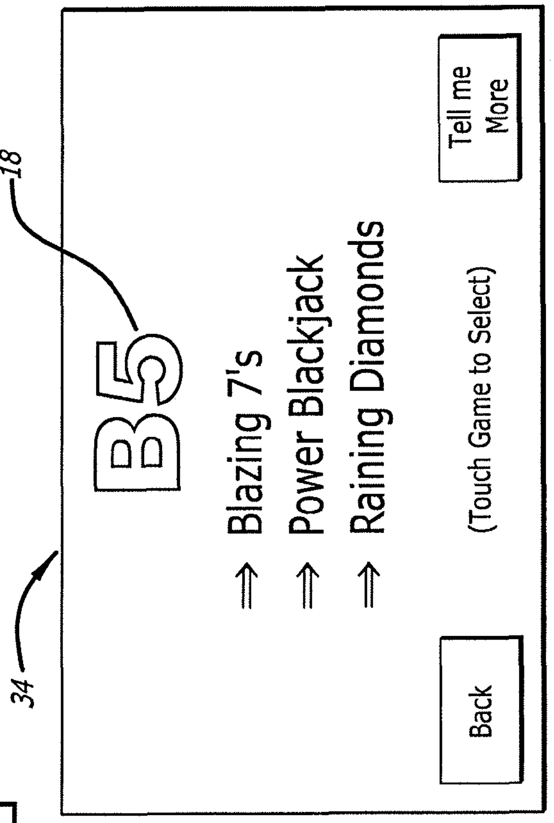
Figure 7:
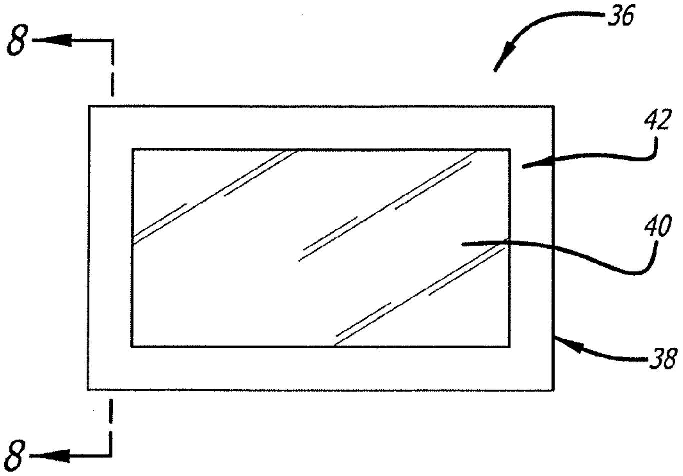
FIG. 7 is a plan view of one embodiment of a generic glass for a gaming machine capable of supporting games having active paylines illuminated.

FIGS. 6A-6B illustrate yet another screenshot 34 of a display a game rating system presented on a video display 22. Specifically, in this screenshot, the game rating icon 18 is presented on the video display 22. Once the player selects a particular game rating icon, a list of all the games having the particular game rating (e.g., "B5") are displayed on the video display 22 as shown in FIG. 6B. In one embodiment, the listed games are the games stored on the gaming machine. In another embodiment, the listed games are all the games that are accessible from the network. Accordingly, in this embodiment, the player is then able to select a game to play from a list of games having a particular game rating. Depending on the gaming machine, the game is uploaded from memory or the game is downloaded from the network. This embodiment of the game rating system allows a player to not only select a game based upon a game rating but also select a particular game theme. For example, the player may be able to select games having music or movie themes.

Figure 8:
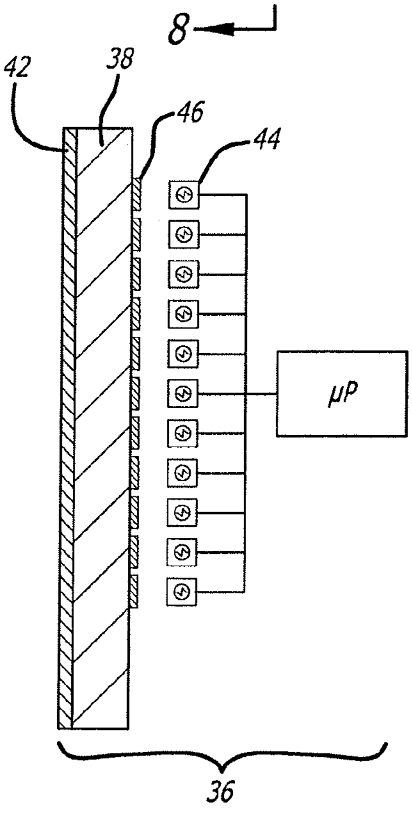
FIG. 8 is a side view of the generic glass of FIG. 7.
Figure 9:
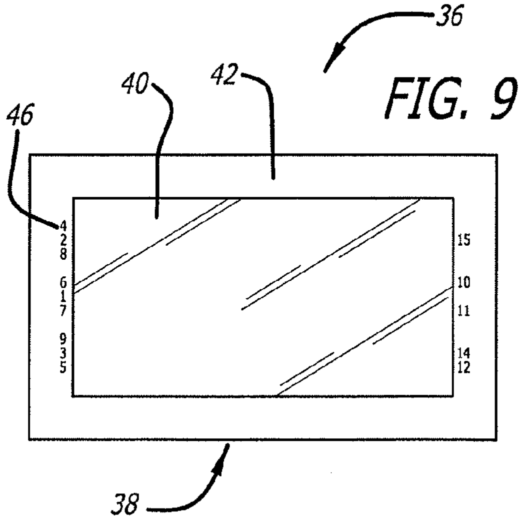
FIGS. 9-10 are plan views of the generic glass of FIG. 7 having different active paylines illuminated.
Figure 10:
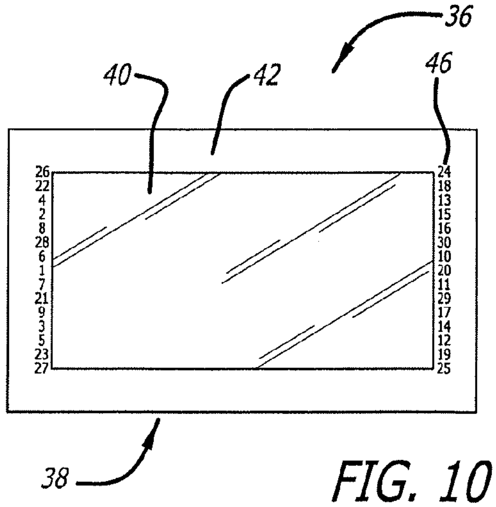

In those gaming machines presenting a plurality of mechanical reel-based games, the gaming machine may include a generic display glass system 36 as shown in FIGS. 7-10. The generic reel glass system 36 includes a display glass 38 having a window 40 displaying the reels of the game and a frame 42 surrounding the window. As shown in FIG. 8, a plurality of light sources 44 (e.g., light emitting diodes (LEDs)) are positioned behind the display glass 38. According to one embodiment, a film having payline numbers 46 is applied to one side of the display glass 38. A black ink (or other opaque film) is applied in the shape of the frame 40 on the opposite side of the display glass 38. In one embodiment, the frame 40 hides any information (e.g., paylines) when the frame is not backlit. However, when the LEDs 44 are illuminated, payline numbers 46 are visible through the frame 40 as shown in FIGS. 9-10.

In one embodiment, the display glass 38 is able to display paylines for 3, 5, 9, 15, 20, 25, and 30-line games without requiring a display glass change. Furthermore, the display glass 38 only illuminates those paylines in order to minimize player confusion if all the paylines were displayed on the glass 38. As those skilled in the art will appreciate, the display glass 38 may be configured to display any combination of paylines.

Figure 11:
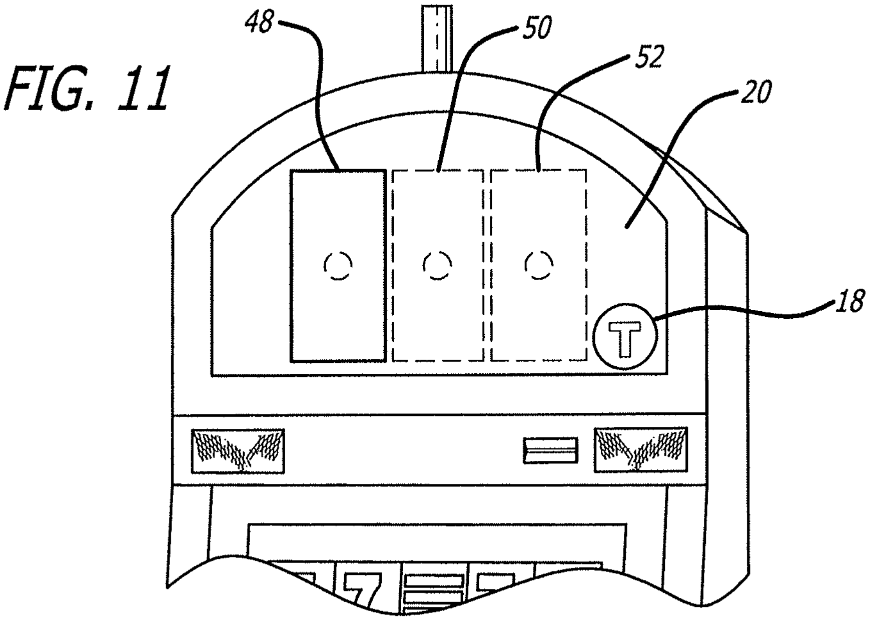
FIG. 11 is a plan view of one embodiment of a top glass capable of presenting one pay table from a plurality of pay tables.
Figure 12:
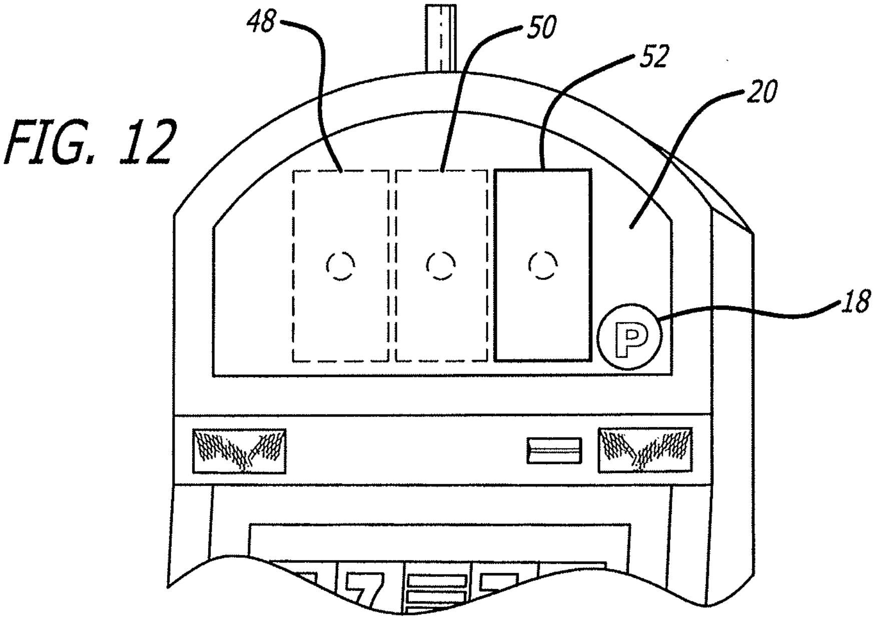
FIG. 12 is a plan view of the top glass of FIG. 11 having a different pay table illuminated.

FIGS. 11-12 illustrate one embodiment of a top box 20 for a gaming machine presenting three games. As shown in FIG. 11, the first pay table 48 of three pay tables 48, 50, 52 is highlighted on the top box 20, and the third pay table is highlighted on the top box in FIG. 12. According to various embodiments, the pay table corresponding to game presented in the main display is illuminated with a backlight or environmental lighting. In another embodiment, the pay tables are displayed on a flat screen video display in the top glass area, belly glass area, or in a display separate from the gaming machine. Also, as shown in FIG. 11, the first pay table 48 is presented for a game having an "T" game rating icon 18, and the third pay table 52 is presented for a game having a "P" game rating icon. As those skilled in the art will appreciate, the game rating icons 18 shown in FIGS. 10-11 are only illustrative and not meant to be limiting.

According to one embodiment, the top box glass of FIGS. 11-12 is configured in a similar fashion to the generic display glass 38 shown in FIGS. 7-10. In another embodiment, the top glass area is a flat screen video display that displays the pay table for the selected game. As those skilled in the art will appreciate, the pay tables may be displayed on the belly glass or in a separate display that is associated with the gaming machine.

According to one embodiment, the various displays for presenting the game rating icons 18, paylines 46, and pay tables 48, 50, 52 are controlled by a game rating system. In this embodiment, the game rating system includes a secondary display for displaying the game rating icon for a particular game. Optionally, the secondary display may also present the pay table for the game.

The game rating system also includes a player interface that allows the player to obtain more information for a particular game icon, select a game based upon a game rating, or switch between games based upon game rating. That is, the player is able to toggle between the games presented on the gaming machine via the player interface. For example, the player may navigate through the various games on the gaming machines based upon the game ratings, the number of maximum paylines, or alphabetically through a listing of the games. According to one embodiment, the player selects a game based upon a particular game rating. In another embodiment, the player selects the particular game rating, and the game rating system randomly selects a game having that particular rating for play. In yet another embodiment, if the player selects a particular game rating and does not select a game within a specified period of time, the game rating system will select a game for play.

In one embodiment, the game rating system is a component of the game controller (not shown). The game controller is a combination of hardware and software components that support the game for a gaming machine or a group of gaming machines. The game controller is configured to support the game and may be responsible for the various functions of the gaming machine, such as, but not limited to, monitoring coin-in, coin-out, or credit meters, and awarding any prize(s) based upon the game result. The game controller also generates the game outcome (i.e., the final stopping position for each reel) and is responsible for determining the desired spin duration for the reels. As those skilled in the art will appreciate, any of these functions may be separated into different or logical units and do not have to exist in a single controller unit.

In another embodiment, the game rating system is a separate component in communication with the game controller. As those skilled in the art will appreciate, the game rating system may be interconnected to the game controller by a USB connection, a wireless network connection, or any other means for operatively coupling components together. In another embodiment, the game rating system and the game controller may be located within the gaming machine 10, but the functions of the game rating system or the game controller may be carried out at a central location (not shown), such as a network server, and communicated to each gaming machine by a local area network, wireless network, wide area network, or the like.

One of ordinary skill in the art will appreciate that not all gaming machines have all these components and may have other components in addition to, or in lieu of, those components mentioned here. Furthermore, while these components are viewed and described separately, various components may be integrated into a single unit in some embodiments.

Figure 13:
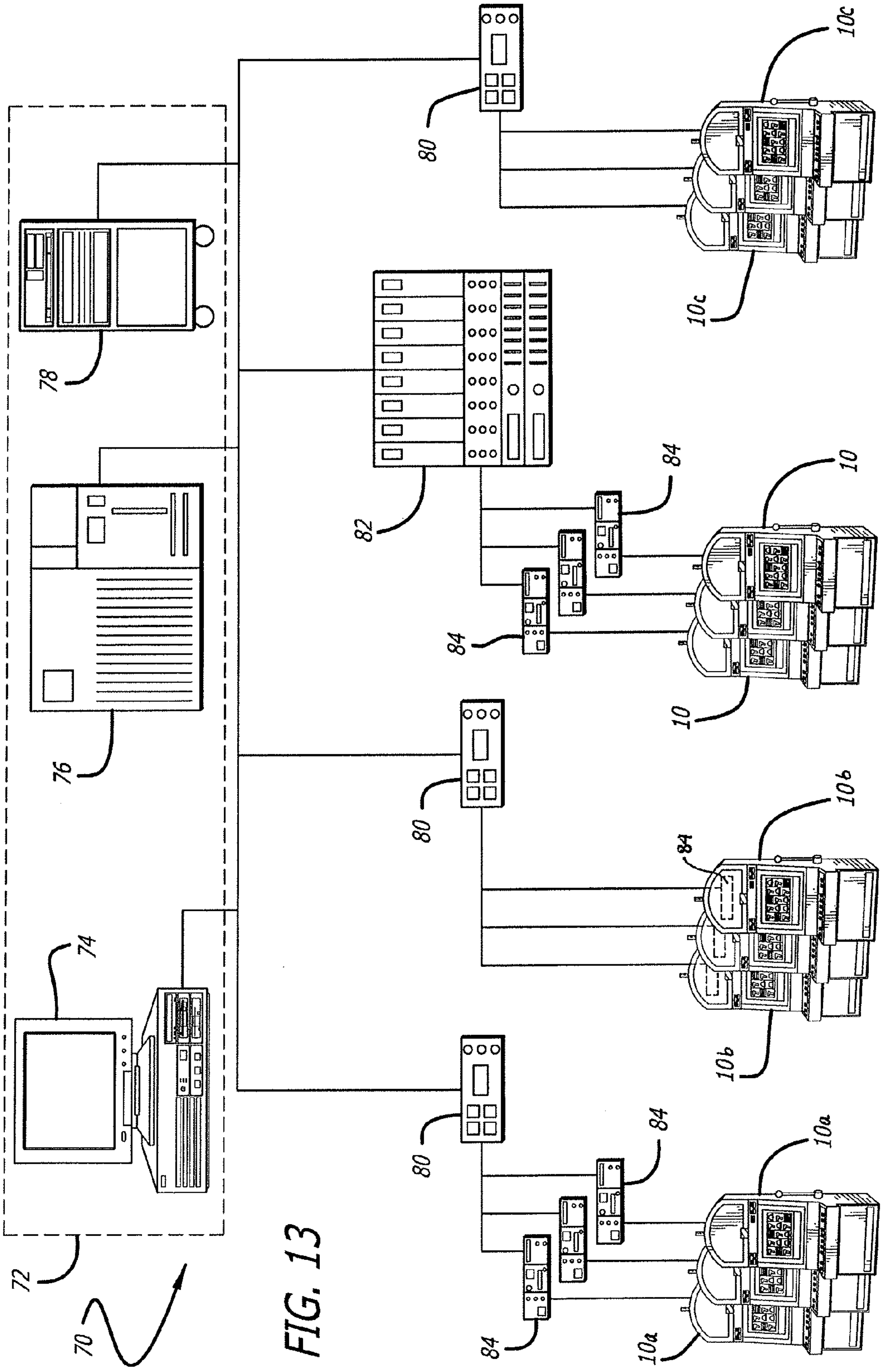
FIG. 13 is a schematic representation of one embodiment of a gaming system in communication with a plurality of gaming machines having a game rating system.

As shown in FIG. 13, a casino gaming system 70 includes one or more gaming machines 10 that are networked with one or more system servers 72. The gaming machines 10 may be connected to the system servers 72 by a broadband TCP/IP connection, a wireless network connection, or any other means for communicating between components.

In one embodiment, the casino network system 70 includes a server system 72. A variety of types of servers may be used as the system server 312. The type of server used is generally determined by the platform and software requirements of the gaming system. Additionally, the server system 72 may be configured to comprise multiple servers. In one embodiment, as illustrated in FIG. 12, the server system 72 is configured to include three servers. Specifically, servers 74, 76 and 78 form the server system 72, or the back-end servers. In one example, server 74 is a Windows® based server, server 76 is an IBM RS6000 based server, and server 78 is an IBM AS/400 based server. Of course, one of ordinary skill in the art will appreciate that different types of servers may also be used. The server system 72 performs several fundamental functions. For example, the server system 72 can collect data from the slot floor as communicated to it from other network components, and maintain the collected data in its database. The server system 72 may use slot floor data to generate a report used in casino operation functions. Examples of such reports include, but are not limited to, accounting reports, security reports, and usage reports. According to one embodiment, the reports may be generated and organized based upon game ratings. The server system 72 may also pass data to another server for other functions. Alternatively, the server system 72 may pass data stored on its database to floor hardware for interaction with a game or game player. For example, data such as a game player's name or the amount of a ticket being redeemed at a game may be passed to the floor hardware. Additionally, the server system 72 may comprise one or more data repositories for storing data. Examples of types of data stored in the system server data repositories include, but are not limited to, information relating to individual player play data, individual game accounting data, gaming machine accounting data, cashable ticket data, and sound data including optimum audio outputs for various casino settings.

According to one embodiment, the server system 72 is able to transmit one or more games and game rating icons 18 to one or more networked gaming machines 10. In this embodiment, the server system 72 is able to manage the games based upon the game rating icons. For example, the configuration of the floor may be viewed in terms of the game rating icons. Accordingly, a casino operator may determine the location of a particular game style of the casino floor. Furthermore, the server system 72 may distribute games to the gaming machines on the casino floor via game rating icons. For example, all tournament games ("T" games) may be distributed to gaming machines located in the center of the casino floor.

Additionally, in another embodiment of the server system 72 generates yield management reports based upon the particular style of the games (i.e., game rating icon). The yield management report includes information such as, but not limited to, number of wins, amount of wins, number of jackpots, amount of jackpots, coin-in, coin-out, win percentage, and any other values that relate to the profitability of the gaming machines.

Given this yield information, the casino operator may be able to configure new gaming machines or reconfigure existing gaming machines based on the yield management information. For example, a casino may want to adjust the yield of a gaming machine by adding a "BW" (i.e., Bonus Wheel game) to the gaming machine. Accordingly, the server system 72 can download the "BW" game to the gaming machine. Optionally, the server system 72 may configure the floor based upon game ratings of the games. For example, the casino operator may download and configure the casino floor such that "V" games (i.e., highly volatile games) are placed at the entrances of the casino and the "E" games (i.e., entertaining dribbler games) are placed in the corners of the casino floor.

The network bridges 80 and network rack 82 shown in FIG. 13 are networking components. These networking components, which may be classified as middleware, facilitate communications between the server system 72 and the game management units 84. The network bridges 80 concentrate the many game management units 84 (2,000 on average) into a fewer number (nominally 50:1) of connections to the server system server 72. Additionally, the network rack 82 may also concentrate game management units 84 into a fewer number (2000:1) of connections to the server system 72. The network bridges 80 and network rack 82 may comprise data repositories for storing network performance data. Such performance data may be based on network traffic and other network related information. Optionally, the network bridge 80 and the network rack 82 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The gaming machines 10, illustrated in FIG. 13, act as terminals for interacting with a player playing a casino game. In various embodiments, any of the gaming machines 10 may be a mechanical reel spinning slot machine, video slot machine, video poker machine, keno machine, video blackjack machine, or a gaming machine offering one or more of the above-described games. Additionally, each gaming machine 10 may comprise one or more data repositories for storing data. Examples of information stored by the gaming machines 10 include, but are not limited to, accounting data, maintenance history information, short and/or long-term play data, real-time play data, and sound data. The sound data may include, but is not limited to, audio files, sound clips, way files, mp3 files and sound files saved in various other formats. Furthermore, each gaming machine 10 comprises an audio system (not shown) for outputting sound.

Game management units (GMUs) 84 connect gaming machines 10 to network bridges 80. The function of the GMU 84 is similar to the function of a network interface card connected to a desktop personal computer (PC). Referring to FIG. 12, a GMU 84 connects a gaming machine 10 to the network bridge 80. Some GMUs have much greater capability and can perform such tasks as calculating a promotional cash-back award for a player, generating a unique ID for a cash redeemable ticket, and storing limited amounts of game and transaction based data. Some GMUs may comprise one or more data repositories for storing data. The types of data stored by the GMUs may include, but is not limited to, real-time game data, communication link performance data, real-time player play data and sound data including sound files and audio clips.

In one embodiment, the GMU 84 is a separate component located outside the gaming machine 10*a*. Alternatively, in another embodiment, the GMU 84 is located within the gaming machine 10*b*. Optionally, in an alternative embodiment, one or more gaming machines 10*c* connect directly to a network bridge 80 and are not connected to a GMU 84. Additionally, in an optional embodiment, the game rating system is housed in the GMU 84.

Of course, one will appreciate that a gaming system 70 may also comprise other types of components, and the above illustrations are meant only as examples and not as limitations to the types of components or games used in a game rating system.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming device having a plurality of games of chance for play, the gaming device comprising:

a plurality of reels having indicia provided therein;

a game controller in communication with the plurality of reels, wherein the game controller generates a game outcome and controls the spinning of the reels; and a game rating system in communication with the game controller, wherein the game rating system alters a game style and volatility index affecting payout frequency of a game of chance in response to player input, wherein the game rating system includes a game rating icon that corresponds to and represents game rating information for an associated game on the gaming device, wherein the game rating icon is displayed to players to enable players to quickly and easily determine if the game associated with the game rating icon is compatible with the player's interest, wherein the game rating system communicates with a server system, wherein at least part of the communication uses a TCP/IP connection, wherein the server system receives information from the gaming device, and wherein the server system manages the plurality of games on the gaming device based on the game rating icon associated with each game.

2. The gaming device of claim 1, wherein the game rating system further comprises:

a player interface for receiving player input, wherein the received player input includes game selection information; and a display for presenting the game style for the game.

3. The gaming device of claim 1, wherein the gaming device further comprises a player interface that is wirelessly connected to the game controller.

4. The gaming device of claim 1, further comprising a network interface in communication with the game controller and a network server, wherein at least part of the communication uses a TCP/IP connection, wherein one or more games are downloaded from the network server to the gaming device.

5. The gaming device of claim 1, wherein at least one of the indicia further comprises a generic symbol is a multiplier symbol, wild symbol, bonus game symbol, free spin symbol, or a progressive jackpot symbol.

6. The gaming device of claim 1, further comprising a network interface in communication with the game controller and a network server, wherein one or more games are downloaded from the network server to the gaming device.

7. The gaming device of claim 1, wherein the gaming device is a mechanical slot machine, a video slot machine, or a combination thereof.

8. A game management system, comprising:

a plurality of networked gaming machines presenting one or more games, wherein a game rating icon is associated with each game;

a game rating system in communication with the game controller, wherein the game rating system alters a game style and volatility index affecting payout frequency of the game of chance in response to player input, wherein the game rating system includes a dynamic game rating icon that corresponds to and represents game rating information for an associated game on the gaming device, wherein the game rating icon is displayed to players to enable players to quickly and easily determine if the game associated with the game rating icon is compatible with the player's interests; and a server system in communication with the plurality of networked gaming machines, wherein at least part of the communication uses a TCP/IP connection, wherein the server system receives information from the networked gaming machines, and wherein the server system manages the plurality of networked games based on the game rating icons associated with each game.

9. The game management system of claim 8, wherein the server system tracks game play and generates reports based on the game rating icons.

10. The game management system of claim 8, wherein the server system distributes one or more games to the plurality of networked gaming machines, wherein the distribution of the games is based on the game rating icons of the games.

11. The game management system of claim 10, wherein the server system further transmits one or more games, game rating icons, or game-related information to the networked gaming machines.

12. The game management system of claim 8, wherein at least one of the networked gaming machines is a mechanical slot machine, a video slot machine, or a combination thereof.

13. The game management system of claim 8, wherein the game rating system further comprises a player interface that is wirelessly connected to the gaming system.

14. The game management system of claim 8, wherein the game rating system further comprises a player interface is a cellular phone.

15. A gaming system, comprising:

a plurality of networked gaming machines, wherein each gaming machine presents a selection of games for game play, wherein a game rating icon is associated with each game;

a game rating system in communication with the game controller, wherein the game rating system alters a game style and volatility index affecting payout frequency of the game of chance in response to player input, wherein the game rating system includes a dynamic game rating icon that corresponds to and represents game rating information for an associated game on the gaming device, wherein the game rating icon is displayed to players to enable players to quickly and easily determine if the game associated with the game rating icon is compatible with the player's interests; and a server system in communication with each of the plurality of networked gaming machines, wherein at least part of the communication uses a TCP/IP connection, wherein the server system transmits one or more games, game-related information, or non-game related information to the networked gaming machines, and wherein the server system manages the plurality of networked games based on the game rating icons associated with each game.

16. The gaming system of claim 15, wherein at least one of the networked gaming machines is a mechanical slot machine, a video slot machine, or a combination thereof.

17. The gaming system of claim 16, wherein at least one slot machine further comprises a plurality of reels each having indicia provided thereon, wherein at least one indicia is a generic symbol having the same physical appearance for each game yet the generic symbol has a unique, predefined property for each game.

18. The gaming system of claim 15, wherein the game rating system further comprises a player interface to receive player input selecting a game having a particular game style.

19. The gaming system of claim 15, wherein the game rating system further comprises a player interface that is wirelessly connected to the gaming system.

20. The gaming system of claim 15, wherein the game rating system further comprises a player interface that is a cellular phone.

* * * * *